United States Patent [19]

Burkes, Jr. et al.

[11] 4,355,663

[45] Oct. 26, 1982

[54] NOZZLE/VALVE DEVICE FOR A DUCTED ROCKET MOTOR

[75] Inventors: William M. Burkes, Jr.; William H. Miller, both of McGregor, Tex.

[73] Assignee: Hercules Incorporated, Wilmington, Del.

[21] Appl. No.: 129,284

[22] Filed: Mar. 11, 1980

[51] Int. Cl.³ .................... F15D 1/02; B64C 15/08; F02K 9/04
[52] U.S. Cl. ......................... 138/44; 138/37; 60/253; 60/271; 60/591
[58] Field of Search ............. 138/45, 46, 40, 44, 138/37; 137/375; 251/335 B; 60/253, 591, 271; 244/74

[56] References Cited

U.S. PATENT DOCUMENTS

| | | | |
|---|---|---|---|
| 1,946,319 | 2/1934 | Hodgson et al. | 138/44 X |
| 2,889,117 | 6/1959 | Wimpress | 138/46 X |
| 2,968,919 | 1/1961 | Hughes et al. | |
| 3,192,709 | 7/1965 | Hardy. | |
| 3,780,982 | 12/1973 | Kemp | 138/44 X |

FOREIGN PATENT DOCUMENTS 1309582 10/1962 France .................. 138/46

*Primary Examiner*—James E. Bryant, III
*Attorney, Agent, or Firm*—Michael B. Keehan

[57] ABSTRACT

A nozzle/valve device for a ducted rocket motor is provided. The nozzle valve device employs a design in which a nozzle throat blockage element can be moved by translational motion into and out of the nozzle throat section of the device. The blockage element is designed so that in the closed position the nozzle throat has a minimum cross-sectional flow area and therefore the nozzle throat is never fully closed. The seals employed in the nozzle/valve device are isolated from contact with reaction products of the gas generator and effective use of minimum amounts of erosion resistant materials is achieved.

10 Claims, 10 Drawing Figures

NOZZLE/VALVE DEVICE FOR A DUCTED ROCKET MOTOR

This invention relates to a nozzle/valve comprising a throat area change device employing a side insertable/retractable cylindrical plunger designed for forming a variable choke area in a nozzle throat and provides a flow channel between a fuel rich solid propellant gas generator and a secondary combustion chamber in a ducted rocket motor.

Fixed-fuel-flow ducted rockets suffer performance degradation when operated at altitudes and fuel-grain soak temperatures substantially different from baseline design conditions. System performance studies for ducted rockets indicate significant improvements are possible if fuel-rich generant flow rate can be controlled so as to approach a near-optimum air-to-fuel ratio for each particular flight and environmental condition.

In accordance with this invention, a nozzle/valve is provided which enables significant improvement in system performance of a ducted rocket motor to be achieved. The nozzle/valve of this invention provides a variable choke area in the nozzle through which fuel-rich generant from a solid propellant gas generator flows into a secondary combustion chamber of a ducted rocket. The nozzle/valve is movable from a fully open position to a closed position. In the closed position the choke area of the nozzle is reduced to a predetermined minimum area but the nozzle throat is never completely closed. Elimination of total closure of the nozzle throat eliminates one cause of catastrophic over-pressurization of a gas generator in a ducted rocket motor. The unique design of the nozzle/valve of this invention permits use of erosion resistant and thermal shock resistant materials at locations which enable minimum quantities of such materials to be effective. The nozzle/valve of this invention employs seals which are removed a substantial distance from the hot flowing gas passing through the nozzle/valve such that the seals remain effective during the life of the unit.

The nozzle/valve of this invention is fully illustrated in the drawings which follow. In the drawings like numbers refer to like parts where applicable.

Figure 3:
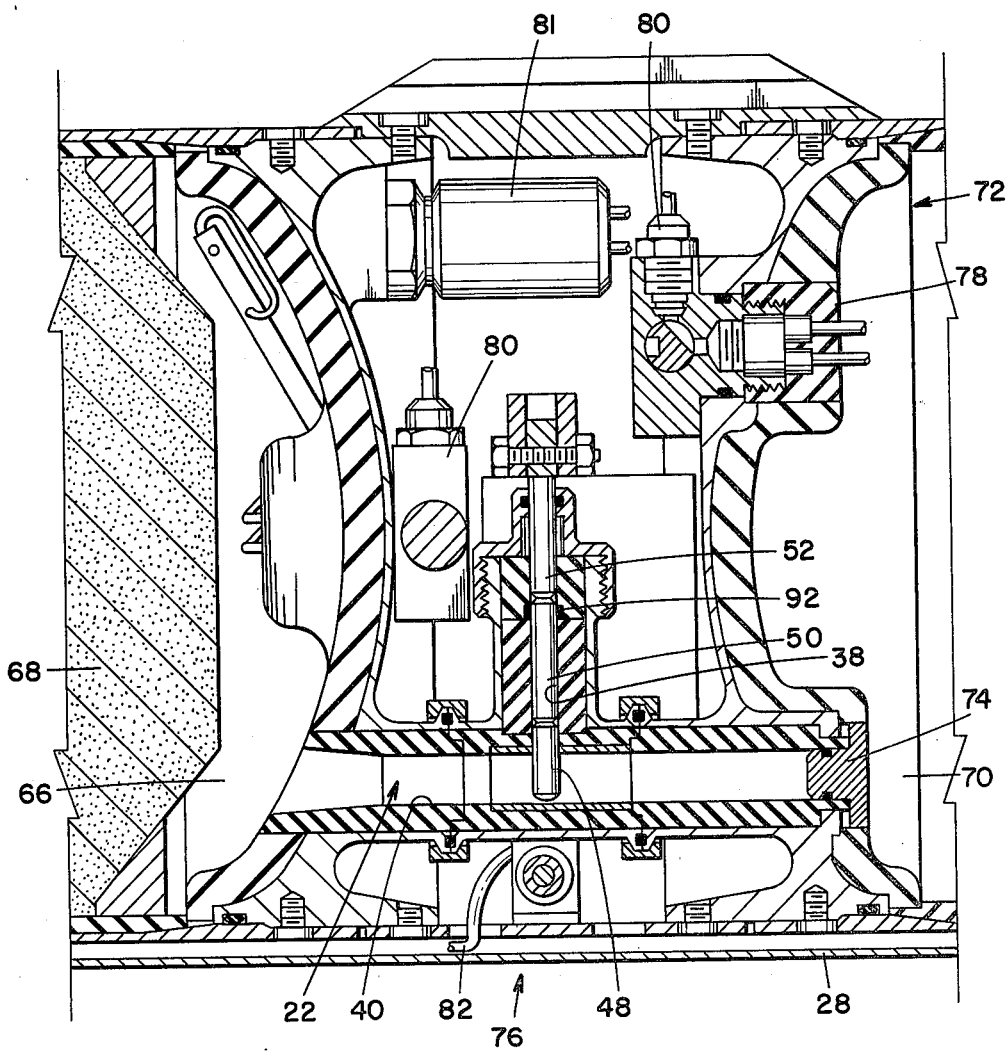

FIG. 3 is a side view of a ducted rocket partially broken away and partially in cross-section illustrating the position of the nozzle/valve of this invention with respect to the forward end of the ducted rocket containing the fuel rich solid propellant grain and the aft end of the ducted rocket containing the secondary combustion chamber which can also be used as a booster propellant rocket chamber.

Figure 4:
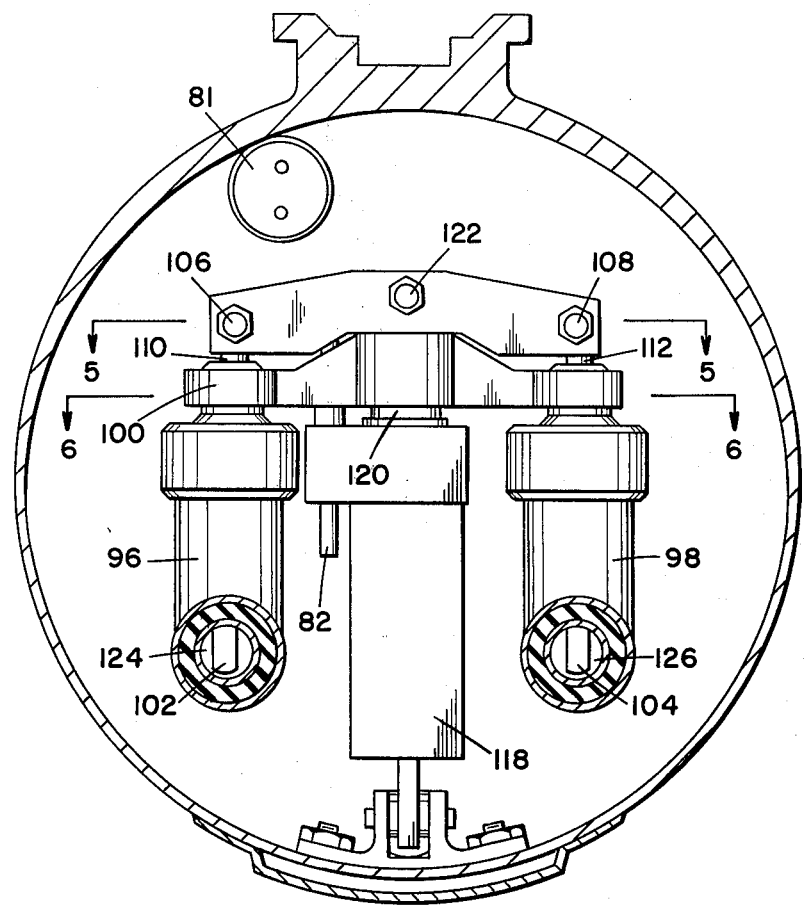

FIG. 4 is a schematic view partly in cross-section illustrating an embodiment of the nozzle/valve of this invention housed in an interstage section of a ducted rocket motor and illustrating dual nozzle/valves and an actuation device capable of moving said nozzle/valves to and from the closed position and the open position.

Figure 5:
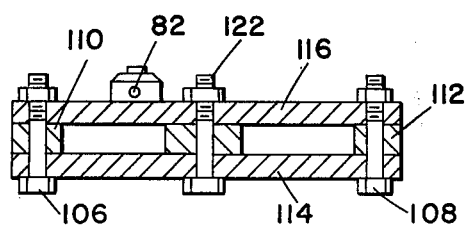

FIG. 5 is a sectional view taken along lines 5—5' of FIG. 4.

Figure 6:
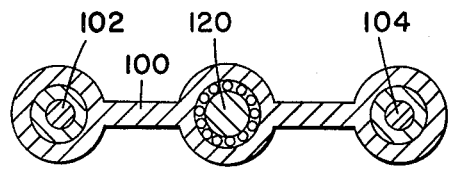

FIG. 6 is a sectional view taken along lines 6—6' of FIG. 4.

Figure 7:
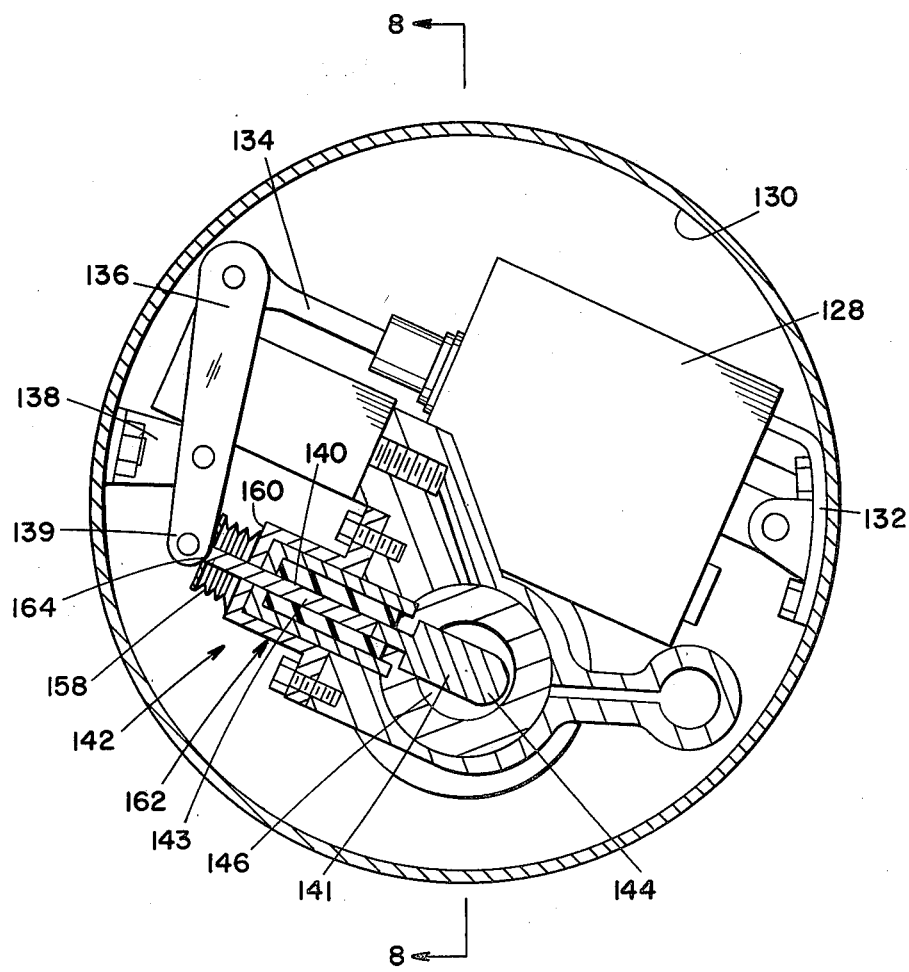

FIG. 7 is a schematic view illustrating the relative positions of a single nozzle/valve of this invention and an actuator means therefor housed within the interstage of a ducted rocket motor.

Figure 8:
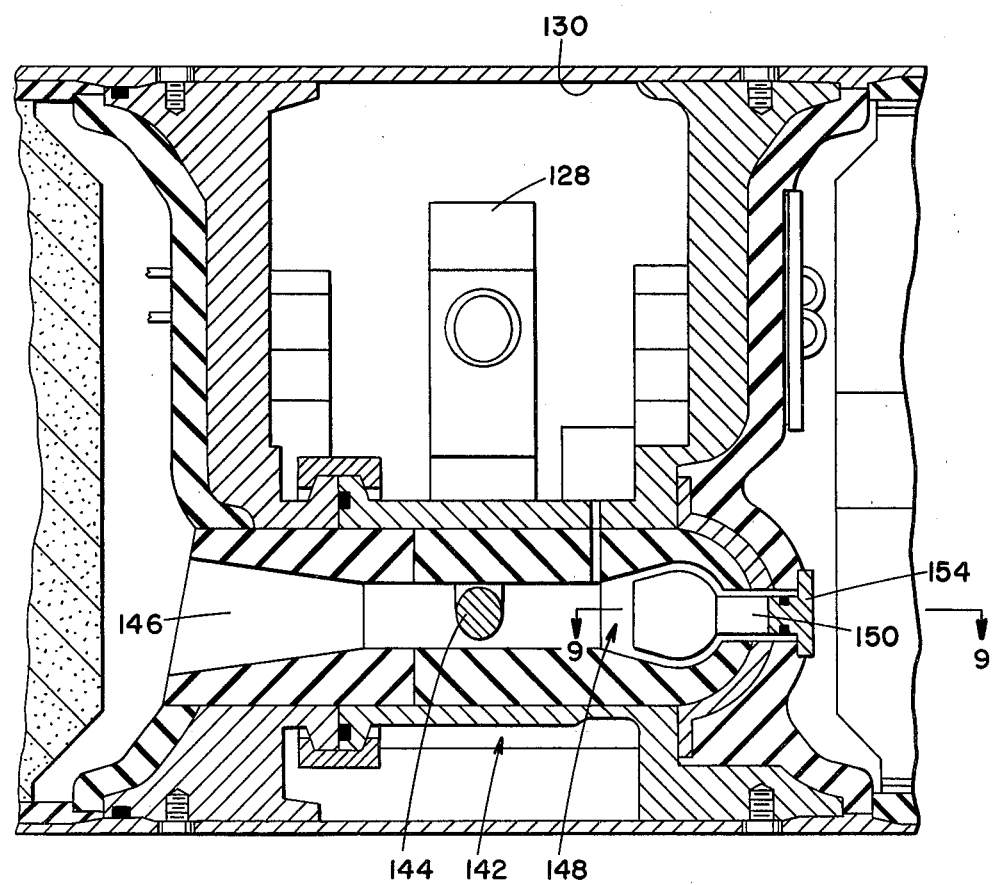

FIG. 8 is a cross-sectional view taken along lines 8—8' of FIG. 7.

Figure 9:
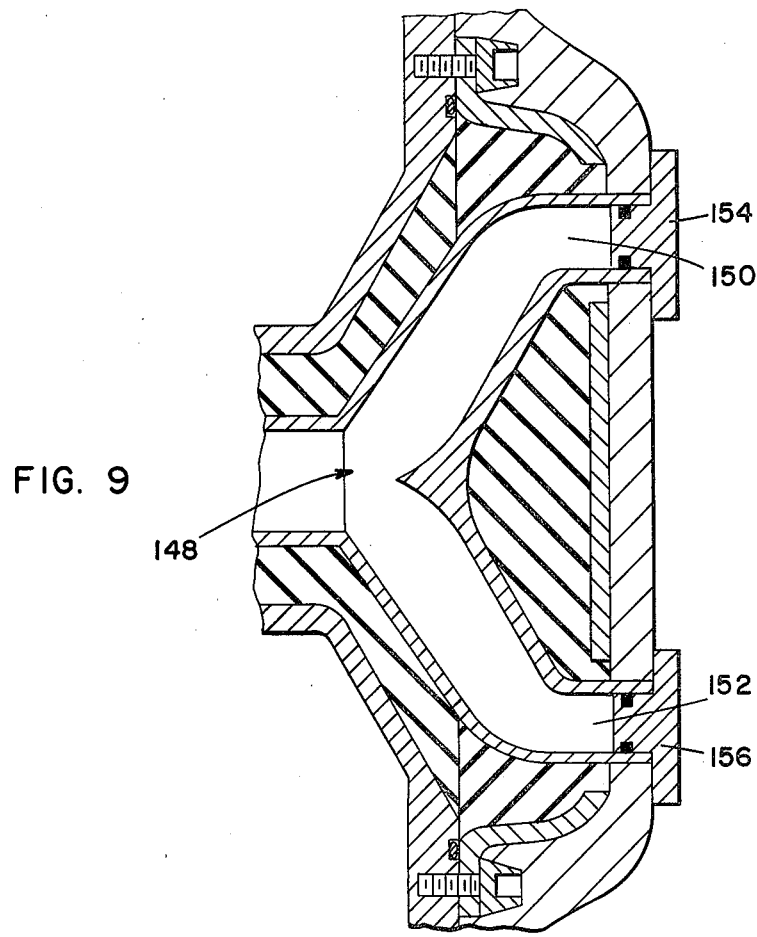

FIG. 9 is a partial cross-sectional view taken along lines 9—9' of FIG. 8 illustrating a dual manifold system employed with a nozzle/valve of this invention.

Figure 10:
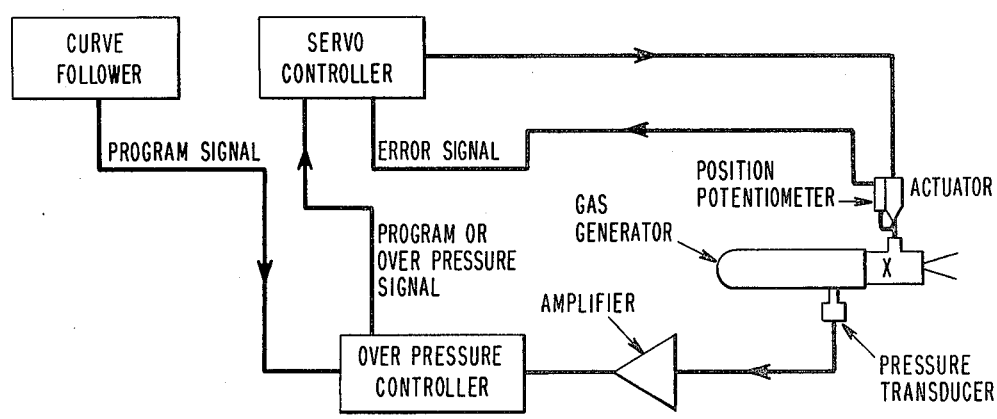

FIG. 10 is a diagram of a preprogramed control loop used for controlling the opening and closing of the nozzle/valve of this invention according to a preprogramed schedule.

Figure 1:
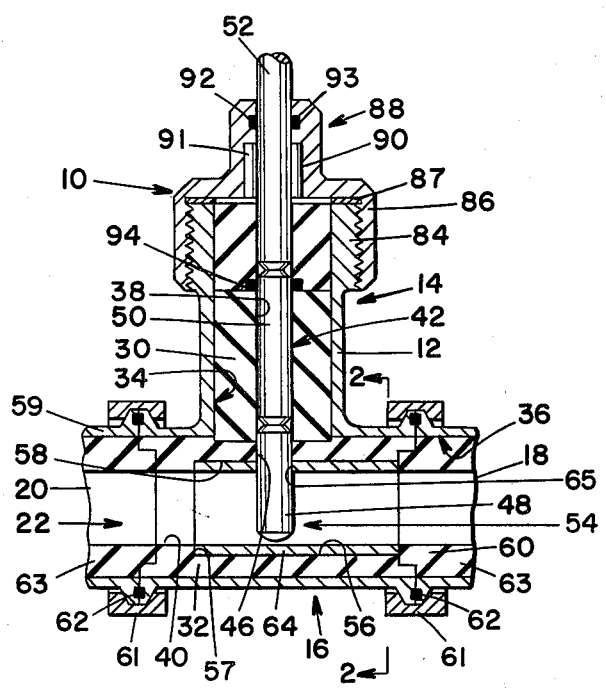
FIG. 1 is a partial front view in cross-section of the nozzle/valve of this invention.

In FIG. 1 the nozzle/valve of this invention is illustrated. The nozzle/valve 10 comprises a valve body 12 having a stem section 14 and a flow section 16. Stem section 14 and flow section 16 are tubular members which are in communication with each other and intersect each other at right angles. The flow section 16 has opposing flow ports 18, 20, either of which may be the inlet or the outlet for gas flow depending on the orientation of the nozzle/valve in the gas flow path in which the valve is mounted.

Both stem section 14 and flow section 16 have tubular insulators 30, 32 which fit into cavities 34, 36 within stem section 14 and flow section 16, respectively, said insulators being contiguous at their outside surfaces with the inside surface of the valve body. Each insulator has a central longitudinal cavity of circular cross-section 38, 40 extending throughout the length of said insulator. The tubular walls formed by central cavity 40 through insulator 32 forms the flow channel 22 through flow section 16, as more clearly shown in FIG. 3. The tubular walls formed by cavity 38 forms a partial housing for plunger 42. Insulator 32 also has a cavity of circular cross-section 46 extending through its side wall at right angles to and intersecting flow channel 22, said cavity 46 being in registration and in axial alignment with cavity 38 in stem section 14 forming a continuation of cavity 38.

Plunger 42 is housed within stem section 14 and passes through central longitudinal cavities 38 and 46 in insulators 30, 32. Plunger 42 is comprised of three sections: a plunger throat 48, a heat insulator 50, and a plunger connecting member 52. Plunger 42 is operated by translational movement between a fully closed position 54 as illustrated in FIG. 1 and a fully open position (not shown) in which plunger throat 48 is removed from flow channel 22. Plunger 42 is moved by actuation device 55, more fully described hereinafter.

In the nozzle/valve described in FIG. 1, insulator 32 has an axial cylindrical cavity 56 which bridges the intersection of the stem section 14 and flow section 16. Axial cavity 56 is defined by annular shoulder 57 and side wall 58. Axial cavity 56 extends from one end of insulator 32 through a substantial portion of the length of insulator 32. The nozzle/valve of this invention can be installed in a ducted rocket motor as shown in FIG. 1 in which the nozzle/valve is connected to throat sections 59 and 60 which are secured by marmon clamps 61 and sealed with O-rings 62. Throat sections 59 and 60 contain insulators 63 which correspond in size and shape with insulator 32 containing cylindrical insert 64. Other means for connecting and sealing of the nozzle/valve of this invention in a ducted rocket motor can be employed. Cylindrical insert 64 is prepared from an erosion resistant material, preferably titanium-zirconium-molybdenum alloy, and is sized to correspond in size to axial cavity 56 and is placed in axial cavity 56. The interior surface formed by insulator 32 and cylindrical insert 64 when inserted into axial cavity 56 is a smooth, substantially continuous surface except for cavity 65 in cylindrical insert 64. Cavity 65 extends through the side wall of cylindrical insert 64 and cavity 65 is in registration and axial alignment with cavities 38 and 46 in insulators 30 and 32.

Valve stem 14 is comprised of a base stem 84 and a stem closure 86. Base stem 84 and stem closure 86 are threaded for locking engagement. A metal C-ring 87 is used to seal the base stem 84 and stem closure 86 when in locking engagement. Other compressible metal faced seals can be employed in place of a metal C-ring 87, such as a copper-asbestos crush gasket. The head 88 of stem closure 86 has a small axial cavity 90. A full complement needle bearing 91 is housed within axial cavity 90. The needle bearing functions as a bearing for plunger 42. An annular cavity 92 in head 88 of stem closure 86 houses elastomeric O-rings 93 which seal directly against plunger 42.

Stem insulator 30 can be a single insulator extending substantially the length of cavity 34 in stem 14 or it can be, as shown in FIG. 1, two cylindrical insulator pieces which fit together forming a substantially continuous insulating surface. When two sections of insulating material form the stem insulator 30, a scrubber seal 94 is employed to seal against plunger 42. Scrubber seal 94 can be prepared from an elastomer (rubber), or a ceramic fiber felted material.

FIG. 3 illustrates the position of the nozzle/valve 10 housed in ducted rocket motor 28 in relation to the forward chamber 66 of the ducted rocket motor 28, the fuel rich gas generator charge 68 housed within a forward chamber 66 within the ducted rocket motor 28 and the secondary combustion chamber 70 at the aft-end 72 of the ducted rocket motor 28. Flow channel 22 connects the forward chamber 66 with the secondary combustion chamber 70. A blow-out plug 74 is used to close flow channel 22 to prevent combustion gases from passing through flow channel 22 into forward chamber 66. Combustion gases result upon ignition of solid propellant (not shown) which forms the boost stage of the ducted rocket motor and which, upon completion of burning, leaves a cavity which becomes the secondary combustion chamber 70. Flow of such gases through flow channel 22 could ignite the fuel rich gas generator 68 out of proper sequence, in operation of a ducted rocket motor. However, in some applications this initial ignition of fuel-rich gas generator 68 is acceptable.

FIGS. 3 and 4 show the interstage 76 between the forward chamber 66 of the ducted rocket motor 28 and the secondary combustion chamber 70. Interstage 76 houses a safe/arm and an igniter device 78 for the booster propellant (not shown), a safe/arm and igniter device 80 for the fuel rich gas generator 68, a pressure transducer 81 for measuring pressure within forward chamber 66 and a linear potentiometer 82 for measuring movement of dual plungers 48 by monitoring the travel of crossbars 114 and 116.

Figure 2:
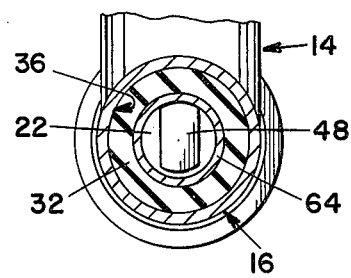
FIG. 2 is a view taken along lines 2—2' of FIG. 1 in cross-section.

In FIG. 4 dual nozzle/valves of the type described in FIGS. 1-3 are illustrated within the interstage 76 of a ducted rocket motor. A crossbar mechanism for moving the nozzle/valve from a closed to an open position is partially illustrated in FIGS. 5 and 6. Dual nozzle/valves 96, 98 are connected by a yoke 100. Valve plungers 102, 104 pass through their respective assemblies 96, 98 and are attached by bolts 106, 108 at their upper ends 110, 112 between crossbar support plates 114, 116. Actuator device 118 is positioned between valve assemblies 96, 98 and actuator plunger 120 of actuator device 118 passes through yoke 100 and is attached through bolt 122 to support plates 114, 116. The actuator device 118 operates in response to an electrical signal as follows. Upon receipt of a signal generated in response to action of the ducted rocket missile, the actuator plunger is moved up or down, in response to the signal, dependent upon how the missile is programed or commanded to function. Movement of plungers 102, 104 out of flow channels 124, 126 removes the blockage from the cross-sectional area of flow channels 124, 126. Also, in response to a signal, actuator plunger 120 can be moved down, moving plungers 102 and 104 into flow channels 124, 126 reducing the flow area through said nozzle.

In FIGS. 7, 8 and 9 a single nozzle/valve device 142 of this invention is illustrated as housed in the interstage of a ducted rocket motor. Actuator device 128 is anchored at one point against the inside wall 130 of the interstage section of the ducted rocket motor by bracket 132. Actuator plunger 134 has a lever arm 136 connected for pivoting movement to plunger 134 and said lever arm 136 is attached for pivoting movement to bracket 138. The opposite end 139 of lever arm 136 is connected to plunger 140 of nozzle/valve 142. Plunger 140 is shown in the fully closed position, i.e., with the plunger throat 144 being inserted to its fullest extent within flow channel 146. Flow channel 146 terminates in manifold 148. Manifold 148 has two exhaust channels which terminate at exhaust ports 150, 152 which ports are sealed by blow-out plugs 154, 156. Nozzle/valve 142 differs from nozzle/valve 10 principally in the seal mechanisms employed. Nozzle/valve 142 has a welded metal bellows seal 158 attached to the face 160 of stem closure 162 and to the attachment end 164 of plunger 140. Bellows seal 158 is capable of expanding and contracting movement in response to movement of plunger 140 and is particularly desirable for high temperature applications where an elastomeric O-ring seal would not function reliably. The plunger 140 is prepared in two sections, an erosion resistant throat section 141 and a heat insulator section 143.

FIG. 10 illustrates a typical control loop for preprograming the operation of a nozzle/valve of this invention. As illustrated, a pressure transducer senses the pressure in the gas generator and sends an electrical signal based on the pressure sensed to an amplifier. The amplified signal is transmitted to a pressure controller wherein the pressure is compared with a signal emitted by a curve follower which is preprogramed and which is activated on firing of the ducted rocket motor. If the electrical signals received by the controller are different the pressure controller emits a signal to the sensor controller which in turn actuates the actuator device to open or close the nozzle/valve as necessary to bring the pressure in the gas generator chamber into agreement with the preprogramed pressure. Control systems other than the system described above can be employed in operation of the nozzle/valve of this invention.

The nozzle/valve of this invention provides a fully variable, multicycle, reversible nozzle in which the nozzle throat area can be varied. The nozzle/valve can be actuated by any suitable means such as electromechanical, pneumatic or hydraulic actuators with feedback control. The nozzle/valve of this invention can be housed in a ducted rocket motor within the gas generator chamber, within the secondary combustion chamber or in an interstage between said chambers which has been illustrated in the drawings. The interstage installation is the preferred position for installation of the nozzle/valve of this invention because of isolation of the nozzle/valve components from the combustion environment of the ducted rocket.

The nozzle/valve of this invention employs translational motion of the nozzle plunger to control gas flow. The design of the nozzle/valve of this invention enables isolation of seals, bearings and the actuation device from direct contact with hot combustion gases and provides a design enabling minimum quantities of erosion resistant materials to be employed effectively at critical points within the nozzle/valve. Isolation and thermal protection of many components achieved by the nozzle/valve of this invention results in improved and reproducible performance for a controllable variable fuel flow ducted rocket motor.

Materials of construction are important in construction of the nozzle/valve of this invention. The throat blockage element described herein as the plunger throat and the throat insert which defines, in part, the flow channel for hot fuel rich products flowing from the gas generator to the secondary combustor must be erosion resistant and have high temperature strength and low thermal expansion. Materials found preferable for use as throat blockage elements at temperature environments of about 2000° F. and 2000 psi were an alloy of titanium, zirconium and molybdenum (TZM), a tungsten-rhenium alloy (W-25RE) and a tantalum-tungsten alloy (TA-10W).

The insulators employed in the nozzle/valve device of this invention are preferably prepared from silica-phenolic materials. High pressure molded silica-phenolic materials are available commercially from Fiberite Corporation, Winona, Minn. A particularly suitable silica-phenolic insulator is prepared from MX 2646 molding compound by Fiberite Corporation. Carbon-phenolic molded insulators can also be employed. Carbon-phenolic insulators are also available from Fiberite Corporation.

Of the various types of devices that can be employed as actuators for the nozzle/valve of this invention that can be employed, electromechanical devices are preferred. Suitable devices are available commercially from Avionic Products Company, Denville, N.J.; Plessey Dynamics Division, Hillside, N.J.; and Motion Controls Division, Cedar Knolls, N.J.

Seals which can be employed in the nozzle/valve of this invention must be selected from materials suitable for use under the temperature conditions encountered in operation of the ducted rocket motor in which the nozzle/valve of this invention is employed. Elastomeric O-rings can be made from materials such as ethylene-propylene terpolymer or silicone rubber. Face seals can be prepared from solid copper gaskets, copper crush gaskets or metal C-rings made from materials such as Inconal X-750 preferably with silver or nickel plating. Such seals are available commercially from UAP Components, Inc. High pressure welded metal bellows seals which can be employed are available commercially from Sealol, Inc. and from The Metal Bellows Corp.

What we claim and desire to protect by Letters Patent is:

1. A nozzle/valve for controlling the flow of combustion products from a fuel generator to a secondary combustion chamber of a ducted rocket motor, said nozzle/valve comprising a valve body having a stem section and a flow section intersecting and attached to said stem section, said stem section comprising an outer stem member and a stem insulator for said outer stem member housed within said outer stem member and extending throughout the length of the outer stem member, said stem insulator having a central longitudinal stem cavity extending throughout the length of the insulator, a flow section comprising an outer flow member and a flow insulator for said outer flow member housed within and extending throughout the length of the outer flow member, said flow insulator having side walls and a central longitudinal cavity extending throughout the length of the flow insulator, the cavity in said flow insulator defining a flow channel through said flow section, and a second cavity extending through the side wall of said flow insulator which second cavity is in registration with the stem cavity in the stem insulator, a valve plunger housed within the stem insulator and having its outer surface contiguous with the interior surface of the stem insulator which is defined by the stem cavity in the stem insulator, said plunger forming the flow blockage element for the flow channel, a stem closure in locking engagement with said stem section, first seal means for sealing between the stem closure and the stem section, second seal means for sealing between the stem closure and the valve plunger, and, actuator means for imparting translational movement to the valve plunger to move said plunger between a closed position in which said plunger partially blocks the flow channel and an open position in which said plunger is removed from the flow channel.

2. A nozzle/valve for controlling the flow of combustion products from a fuel generator to a secondary combustion chamber of a ducted rocket motor, said nozzle/valve comprising a valve body having a stem section and a flow section intersecting and attached to said stem section, said stem section comprising an outer stem member and a stem insulator for said outer stem member housed within said outer stem member and extending throughout the length of the outer stem member, said stem insulator having a central longitudinal stem cavity extending throughout the length of the insulator, a flow section comprising an outer flow member and a flow insulator for said outer flow member housed within and extending throughout the length of the outer flow member, said flow insulator having side walls and a central longitudinal cavity extending throughout the length of the flow insulator, the cavity in said flow insulator defining a flow channel through said flow section, and a second cavity extending through the side wall of said flow insulator which second cavity is in registration with the stem cavity in the stem insulator, a valve plunger housed within the stem insulator and having its outer surface contiguous with the interior surface of the stem insulator which is defined by the stem cavity in the stem insulator, said plunger forming the flow blockage element for the flow channel, a stem closure in locking engagement with said stem section, first seal means for sealing between the stem closure and the stem section, second seal means for sealing between the stem closure and the valve plunger, third seal means engaging said plunger and said stem insulator, and actuator means for imparting translational movement to the valve plunger to move said plunger between a closed position in which said plunger partially blocks the flow channel and an open position in which said plunger is removed from the flow channel.

3. The nozzle/valve of claims 1 or 2 in which the valve plunger has a plunger throat, said plunger throat being prepared from a titanium-zirconium-molybdenum alloy.

4. The nozzle/valve of claims 1 or 2 in which the stem insulator and the flow insulator are prepared from a silica-phenolic composition.

5. The nozzle/valve of claim 2 in which the stem insulator comprises two sections prepared from silica-phenolic material which sections in assembly comprise a substantially continuous insulator, and in which the third seal means is positioned at the intersection of the two sections of the stem insulator.

6. The nozzle/valve of claims 1 or 2 in which the first seal means is a metal C-ring.

7. The nozzle/valve of claims 1 or 2 in which the second seal means is a metal bellows seal.

8. The nozzle/valve of claims 1 or 2 in which the second seal means is an elastomeric O-ring.

9. The nozzle/valve of claims 1 or 2 in which the flow insulator has an axial cavity in the shape of a thin cylinder extending from one end of said cylinder throughout a substantial part of the length of the insulator, the interior walls formed by said cavity comprising a part of the interior surface of said flow insulator, and an erosion resistant cylinder having a size and shape conforming to said cavity, said cylinder being inserted into and filling said cavity, said erosion resistant cylinder having a side wall cavity of circular cross section extending throughout the side wall of said insulator, said side wall cavity being in registration with the second cavity in the side wall of the flow insulator.

10. The nozzle/valve of claims 1 or 2 in which the flow insulator has an axial cavity in the shape of a thin cylinder extending from one end of said cylinder throughout a substantial part of the length of the insulator, the interior walls formed by said cavity comprising a part of the interior surface of said flow insulator, and an erosion resistant cylinder prepared from a titanium-zirconium-molybdenum alloy having a size and shape conforming to said cavity, said cylinder being inserted into and filling said cavity, said erosion resistant cylinder having a side wall cavity of circular cross section extending throughout the side wall of said insulator, said side wall cavity being in registration with the second cavity in the side wall of the flow insulator.

* * * * *